(12) United States Patent
Vollebregt et al.

(10) Patent No.: US 10,864,660 B2
(45) Date of Patent: *Dec. 15, 2020

(54) CORE FOR THE MOULDING OF A BLADE HAVING SUPERIMPOSED CAVITIES AND INCLUDING A DE-DUSTING HOLE TRAVERSING A CAVITY FROM END TO END

(71) Applicant: SAFRAN AIRCRAFT ENGINES, Paris (FR)

(72) Inventors: Matthieu Jean Luc Vollebregt, Asnieres sur Seine (FR); Patrick Emilien Paul Emile Huchin, Tessancourt sur Aubette (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 331 days.

This patent is subject to a terminal disclaimer.

(21) Appl. No.: 15/195,088

(22) Filed: Jun. 28, 2016

(65) Prior Publication Data

US 2016/0375610 A1    Dec. 29, 2016

(30) Foreign Application Priority Data

Jun. 29, 2015 (FR) .................................... 15 56068

(51) Int. Cl.
*B29C 33/76* (2006.01)
*F01D 5/18* (2006.01)
(Continued)

(52) U.S. Cl.
CPC .............. *B29C 33/76* (2013.01); *B22C 9/103* (2013.01); *F01D 5/187* (2013.01); *F01D 5/20* (2013.01);
(Continued)

(58) Field of Classification Search
CPC ....... B29C 33/76; B29C 53/82; B29C 33/448; B29C 33/52; B22C 9/103
See application file for complete search history.

(56) References Cited

U.S. PATENT DOCUMENTS 4,289,191 A * 9/1981 Myllymaki ............. B29C 45/20
164/230
4,616,976 A * 10/1986 Lings ...................... F01D 5/186
415/114

(Continued)

FOREIGN PATENT DOCUMENTS

EP     1 754 555 A1    2/2007
FR     2 957 828       9/2011
(Continued)

OTHER PUBLICATIONS

Search Report dated Jan. 26, 2017 in United Kingdom Patent Application No. GB1611293.0.
(Continued)

*Primary Examiner* — Xiao S Zhao
*Assistant Examiner* — Emmanuel S Luk
(74) *Attorney, Agent, or Firm* — Oblon, McClelland, Maier & Neustadt, L.L.P.

(57) ABSTRACT

A core for the moulding of a turbine engine blade, this blade including a vane extending along a spanwise direction and ending in a top, this core including a first core element to delimit a first internal cavity and a second core element of which at least one portion delimits a second internal cavity. The second cavity is situated between the first cavity and the top of the blade along the spanwise direction, and the portion of the second core element delimiting the second cavity includes a through hole, which emerges in line with an end face of the first core element to constitute a de-dusting conduit of the first cavity, this conduit traversing the second
(Continued)

cavity from end to end while emerging in the top of the blade.

4 Claims, 3 Drawing Sheets

(51) Int. Cl.
    *B22C 9/10*           (2006.01)
    *F01D 5/20*           (2006.01)

(52) U.S. Cl.
    CPC .... *F05D 2230/21* (2013.01); *F05D 2260/607* (2013.01); *Y02T 50/60* (2013.01)

(56) References Cited

U.S. PATENT DOCUMENTS

| | | | | |
|---|---|---|---|---|
| 5,002,460 A * | 3/1991 | Lee | F01D 5/188 | 415/115 |
| 5,295,530 A * | 3/1994 | O'Connor | B22C 9/04 | 164/133 |
| 5,337,805 A * | 8/1994 | Green | F01D 5/187 | 164/122.1 |
| 5,599,166 A * | 2/1997 | Deptowicz | B22C 9/04 | 164/369 |
| 5,810,552 A * | 9/1998 | Frasier | B22C 9/04 | 415/115 |
| 5,853,044 A * | 12/1998 | Wheaton | B22C 7/02 | 164/516 |
| 5,997,251 A * | 12/1999 | Lee | F01D 5/187 | 416/97 R |
| 6,126,396 A * | 10/2000 | Doughty | F01D 5/187 | 416/97 R |
| 6,200,087 B1 * | 3/2001 | Tung | F01D 5/186 | 415/115 |
| 6,340,047 B1 * | 1/2002 | Frey | B22C 21/14 | 164/122.1 |
| 6,514,037 B1 * | 2/2003 | Danowski | F01D 5/186 | 415/115 |
| 6,554,563 B2 * | 4/2003 | Noe | F01D 5/189 | 415/115 |
| 6,626,230 B1 * | 9/2003 | Woodrum | B22C 1/22 | 164/137 |
| 6,874,988 B2 * | 4/2005 | Tiemann | F01D 5/189 | 415/115 |
| 6,884,036 B2 * | 4/2005 | Shi | F01D 5/187 | 415/115 |
| 6,929,054 B2 * | 8/2005 | Beals | B22C 7/02 | 164/365 |
| 7,137,779 B2 * | 11/2006 | Liang | F01D 5/187 | 416/1 |
| 7,278,826 B2 * | 10/2007 | Blaskovich | F01D 5/187 | 164/369 |
| 7,431,562 B2 * | 10/2008 | Hooper | F01D 5/187 | 416/97 R |
| 7,469,739 B2 * | 12/2008 | Otero | B22C 9/04 | 164/369 |
| 7,510,367 B2 * | 3/2009 | Liang | F01D 5/145 | 415/115 |
| 7,780,414 B1 * | 8/2010 | Liang | B22C 9/10 | 164/369 |
| 7,862,299 B1 * | 1/2011 | Liang | F01D 5/147 | 416/97 R |
| 8,192,146 B2 * | 6/2012 | Liang | F01D 5/186 | 415/115 |
| 8,591,189 B2 * | 11/2013 | Correia | F01D 5/187 | 416/96 R |
| 9,314,838 B2 * | 4/2016 | Pointon | F01D 5/187 | |
| 9,726,023 B2 * | 8/2017 | Spangler | F01D 5/147 | |
| 9,920,635 B2 * | 3/2018 | Bommisetty | F01D 5/188 | |
| 10,077,664 B2 * | 9/2018 | Clum | F01D 5/187 | |
| 10,094,287 B2 * | 10/2018 | Kostka, Jr. | F02C 7/18 | |
| 10,618,106 B2 * | 4/2020 | Huchin | B22C 9/103 | |
| 2004/0208748 A1 * | 10/2004 | Schwartz | F01D 5/189 | 416/224 |
| 2006/0048914 A1 * | 3/2006 | Wiedemer | B22C 9/103 | 164/369 |
| 2007/0025851 A1 | 2/2007 | Guerche et al. | | |
| 2007/0147997 A1 | 6/2007 | Cunha et al. | | |
| 2008/0131285 A1 * | 6/2008 | Albert | B22C 9/04 | 416/96 R |
| 2008/0181774 A1 * | 7/2008 | Cunha | B22C 9/043 | 416/92 |
| 2011/0293434 A1 * | 12/2011 | Lee | B22C 7/026 | 416/229 R |
| 2012/0118524 A1 * | 5/2012 | Ahmad | B22C 7/06 | 164/339 |
| 2013/0025815 A1 * | 1/2013 | Nibouar | B22C 9/02 | 164/271 |
| 2013/0139990 A1 * | 6/2013 | Appleby | B22C 9/22 | 164/47 |
| 2015/0122445 A1 | 5/2015 | Truelle et al. | | |
| 2015/0132139 A1 * | 5/2015 | Tran | B22C 9/04 | 416/223 A |
| 2016/0346831 A1 * | 12/2016 | Snyder | B22C 9/10 | |
| 2018/0050386 A1 * | 2/2018 | Tallman | B22C 9/103 | |
| 2018/0073373 A1 * | 3/2018 | Paquin | B22C 9/04 | |
| 2018/0161852 A1 * | 6/2018 | McCarren | B22C 9/22 | |
| 2018/0161859 A1 * | 6/2018 | Garay | B22C 9/22 | |

FOREIGN PATENT DOCUMENTS

| | | |
|---|---|---|
| FR | 2 986 982 | 8/2013 |
| FR | 2 997 442 A1 | 5/2014 |
| WO | WO 2013/167847 A2 | 11/2013 |
| WO | WO 2016/097586 A1 | 6/2016 |

OTHER PUBLICATIONS

French Preliminary Search Report dated Apr. 27, 2016 in French Application 15 56068 filed on Jun. 29, 2015 (with English Translation of Categories of Cited Documents).

\* cited by examiner

CORE FOR THE MOULDING OF A BLADE HAVING SUPERIMPOSED CAVITIES AND INCLUDING A DE-DUSTING HOLE TRAVERSING A CAVITY FROM END TO END

TECHNICAL FIELD

The invention relates to the manufacture of a blade of an aircraft engine of turbine engine type, such as for example a turbojet or a turboprop engine.

STATE OF THE PRIOR ART

In such a turbojet type engine, marked by 1 in FIG. 1, air is let into an inlet sleeve 2 to traverse a fan comprising a series of rotating vanes 3 before being split into a central primary flow and a secondary flow surrounding the primary flow.

The primary flow is compressed by low pressure 4 and high pressure 6 compressors before reaching a combustion chamber 7, after which it reduces in pressure while traversing turbines 8, before being evacuated while generating thrust. The secondary flow is for its part propelled directly by the fan to generate additional thrust.

Each turbine 8 comprises series of blades oriented radially and regularly spaced around a rotating shaft AX, an outer casing 9 surrounding the whole of the engine.

The cooling of the blades is ensured by circulating in each blade air withdrawn upstream of the combustion and let in at the blade foot, this air being evacuated via borings traversing the walls of these blades.

Such a blade, which is marked by 11 in FIG. 2, includes a foot P through which it is fixed to a rotating body, and a vane 12 borne by this foot P, the foot and the vane being separated by a platform 13.

The vane 12 has a left-twisted shape around an axis EV called spanwise axis which is perpendicular to the axis AX. It includes a base through which it is connected to the platform 13 and which extends radially up to a top S which is the free end of this vane. The two main walls of the vane are its pressure face wall 14 and its suction face wall not visible in FIG. 2, which are spaced apart from each other in their current portion and which merge at the level of the trailing edge 15.

The top S of the blade 11 comprises a closing wall perpendicular to the direction EV, and which connects the pressure face and suction face walls. This closing wall not visible in FIG. 2 is set back towards the axis AX with respect to the free edges of the pressure face and suction face walls. It jointly delimits with these edges a hollow portion open in a direction opposite to the axis AX, called bath represented schematically in broken lines and marked by B, which is situated at the head of the blade that is to say at the level of its top.

Higher performance requirements lead to optimising the cooling of the blade which is ensured by circulation of air in internal cavities and channels of this blade. This optimisation leads to multiplying the number of internal cavities and channels, which gives rise to interwoven geometric shapes which can be complex.

In order to ensure that the cooling cannot be degraded, each internal cavity is connected to the outside by at least one de-dusting hole for evacuating any dusts so that they do not obstruct the circulation of air.

The aim of the invention is to provide a manufacturing method making it possible to produce a large variety of shapes of internal cavities while ensuring the de-dusting thereof.

DESCRIPTION OF THE INVENTION

The subject matter of the invention is a core for the moulding of a turbine engine blade, this blade including a vane extending along a spanwise direction of the blade and ending in a top, this core including a first core element to delimit a first internal cavity of the blade and a second core element of which at least one portion delimits a second internal cavity of the blade, these core elements being rigidly connected together, the second cavity being situated between the first cavity and the top of the blade along the spanwise direction, and in which the portion of the second core element which delimits the second cavity includes a through hole having a general orientation corresponding to that of the spanwise direction, and which emerges in line with an end face of the first core element to form in the moulded blade a bridge fitting traversing the second cavity in order to enable the constitution of a de-dusting conduit of the first cavity, this de-dusting conduit traversing the second cavity from end to end while emerging in the top of the blade.

With this solution, the de-dusting hole of the first cavity may traverse the central part of the second cavity, such that it is not necessary to modify the shape of this second cavity.

The invention also relates to a core thus defined, for a blade including a vane extending along a spanwise direction of the blade and ending in a top, this core including a first core element to delimit a first internal cavity of the blade and a second core element of which at least one portion delimits a second internal cavity of the blade, these core elements being rigidly connected together, the second cavity being situated between the first cavity and the top of the blade along the spanwise direction, and in which the portion of the second core element which delimits the second cavity includes a through hole having a general orientation corresponding to that of the spanwise direction, and which emerges in line with an end face of the first core element to form in the moulded blade a bridge fitting traversing the second cavity in order to enable the constitution of a de-dusting conduit of the first cavity, this de-dusting conduit traversing the second cavity from end to end while emerging in the top of the blade.

The invention also relates to a core thus defined, in which the through hole is situated in a central region of the portion of the second core element which delimits the second cavity, to be spaced apart from each lateral face of this core element in order to constitute in the finished blade an obstacle dividing into two lateral flows the air circulating in the second cavity.

The invention also relates to a core thus defined, further comprising an alumina rod of diameter less than the diameter of the through hole, this alumina rod being borne by the end face of the first core element and extending inside the hole traversing the portion of the second core which delimits the second cavity.

The invention also relates to a core thus defined, in which the first core element is arranged to delimit a cooling channel of a trailing edge of the blade, and in which the second core element is arranged to delimit a beneath bath cavity of the blade.

The invention also relates to a turbine engine blade obtained with the core thus defined.

The invention also relates to a turbine engine including a blade thus defined.

DETAILED DESCRIPTION OF PARTICULAR EMBODIMENTS

The basis of the invention is to provide a beneath bath cavity supplied with air via a dedicated channel, situated between the bottom of the bath and the end of a cooling channel of the trailing edge, by providing a de-dusting hole traversing the beneath bath cavity and emerging in the bottom of the bath to de-dust the cooling channel of the trailing edge. This beneath bath cavity makes it possible to cool efficiently the top of the blade which constitutes the bottom of the bath, while enabling the de-dusting of the downstream cooling channel of the trailing edge.

Hereafter, the terms upstream and downstream are used with respect to the direction of flow of the fluid in the turbojet engine in operation, and in particular around a blade.

Figure 1:
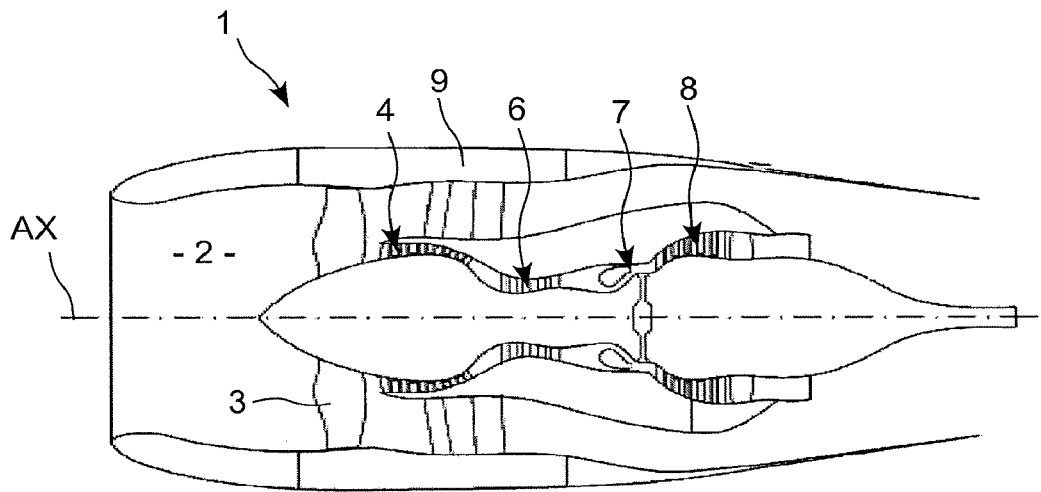
FIG. 1 already described is an overall view of a turbojet engine with double flow represented in longitudinal section.
Figure 2:
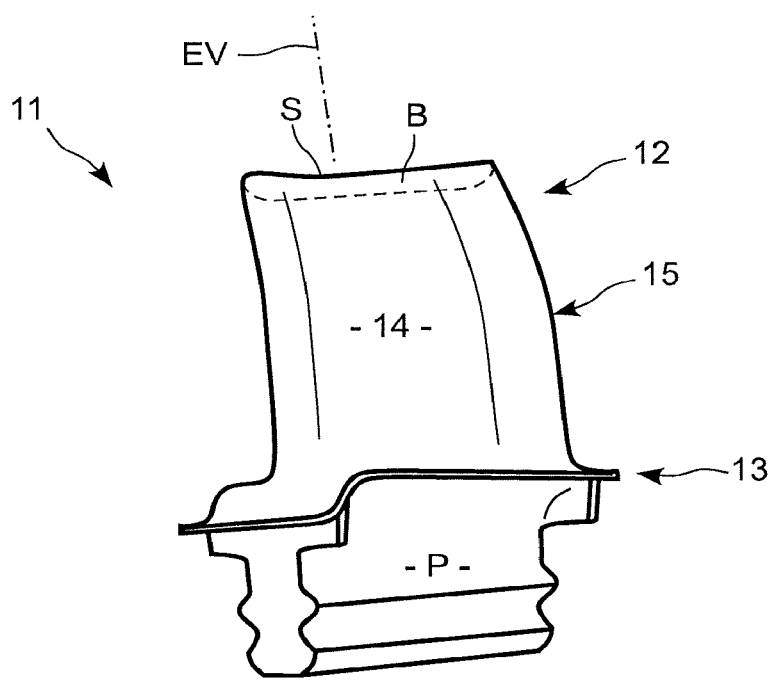
FIG. 2 already described is an overall view of a turbojet engine blade.
Figure 3:
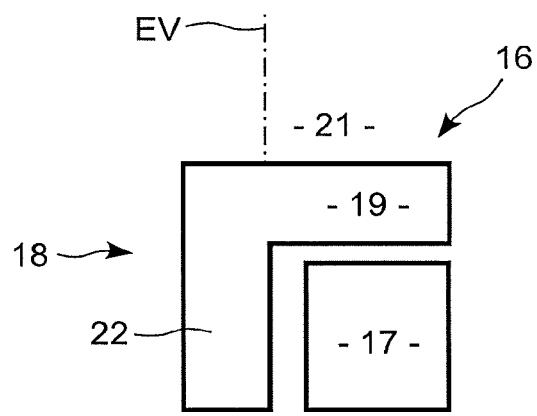
FIG. 3 is a schematic representation of a part of a core intended for the moulding of a blade comprising a cooling channel of its trailing edge and a beneath bath cavity situated between the end of this channel and the top of the blade.
Figure 4:
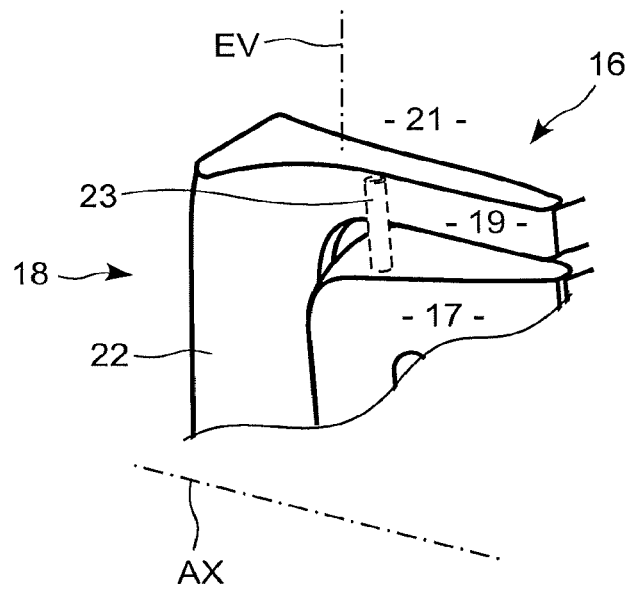
FIG. 4 is a perspective view of a part of a core intended for the moulding of a blade comprising a cooling channel of its trailing edge and a beneath bath cavity situated between the end of this channel and the top of the blade with a de-dusting hole of the channel which runs along an edge of the beneath bath cavity.

As may be seen in FIGS. 3 and 4, a core 16 for manufacturing a blade including a beneath bath cavity and a cooling channel of its trailing edge comprises a downstream core element 17 delimiting the cooling channel, and an upstream core element 18 delimiting the beneath bath cavity.

The downstream element 17 has a generally elongated shape which extends along a spanwise direction EV of the vane of this blade, from its base up to a region close to its top.

The upstream element 18 comprises an upper portion 19 extending between the end of the downstream core 17 and the location of the bath 21 corresponding to the top of the blade, to delimit the beneath bath cavity, and a supply portion 22 perpendicular to the upper portion 19 extending along the spanwise direction EV.

As may be seen in FIGS. 3 and 4, the supply portion 22 is situated upstream of the downstream element 17 with respect to the direction of flow of the fluid around the blade in operation. The beneath bath cavity is thus supplied with cooling air by a dedicated channel, delimited by the portion 22: it thus receives cool air making it possible in particular to cool efficiently the bottom of the bath, that is to say the top of the blade.

As illustrated in FIGS. 3 and 4, a possibility for forming a hole represented by the broken line contour 23 and of which the function is to de-dust the channel delimited by the downstream core 17 may consist in reducing the thickness of the beneath bath cavity which delimits the upper portion 19 of the upstream core 18. This makes it possible to form a hole substantially parallel to the spanwise direction EV which runs along a face 24 of this beneath bath cavity to emerge in the bottom of the bath.

Figure 5:
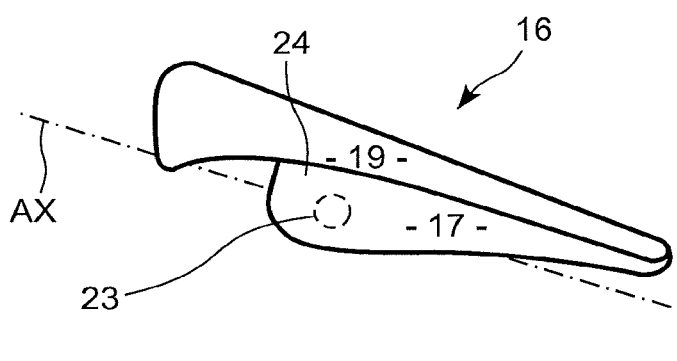
FIG. 5 is a top view of a part of a core intended for the moulding of a blade comprising a cooling channel of its trailing edge and a beneath bath cavity situated between the end of this channel and the top of the blade with a de-dusting hole of the channel which runs along an edge of the beneath bath cavity.

The arrangement of FIGS. 4 and 5 nevertheless implies providing a surplus of material along the face 24 of the beneath bath cavity which is the face situated on the pressure face side of the blade, which significantly increases the mass in the region of the top of the blade. This gain in mass increases in an important manner the centrifugal traction undergone by the blade in service.

Furthermore, this mass of material situated on the pressure face side of the blade penalises the cooling of the blade in this zone. And finally, this mass of material corresponds to a reduction in the dimensions of the bath, which again penalises the cooling at the vane top.

According to the invention, a hole is on the contrary provided which traverses the upper portion of the upstream core in its central part, so as to form once the blade is finished a central block traversing along the spanwise direction the beneath bath cavity. This central block is itself traversed by the actual de-dusting hole extending along the spanwise direction to place the downstream channel directly in communication with the bottom of the bath.

This hole may be obtained either by boring once the blade has been cast, or be delimited by an alumina rod connected to the core, such that it is then directly present when the blade has been moulded.

Figure 6:
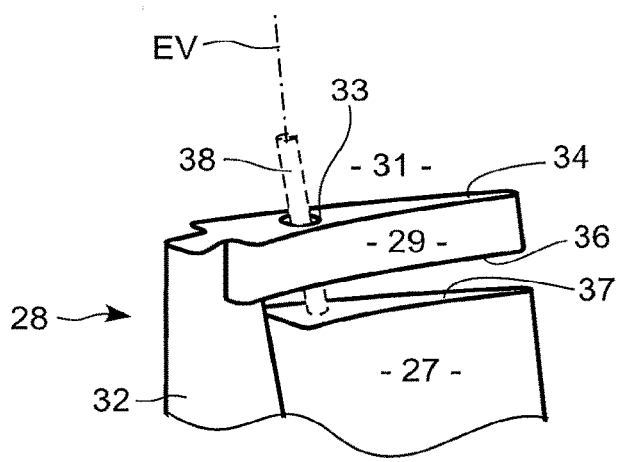
FIG. 6 is a perspective view of a part of a core according to the invention intended for the moulding of a blade comprising a cooling channel of its trailing edge and a beneath bath cavity situated between the end of this channel and the top of the blade with a de-dusting hole of the channel which traverses the beneath bath cavity.
Figure 7:
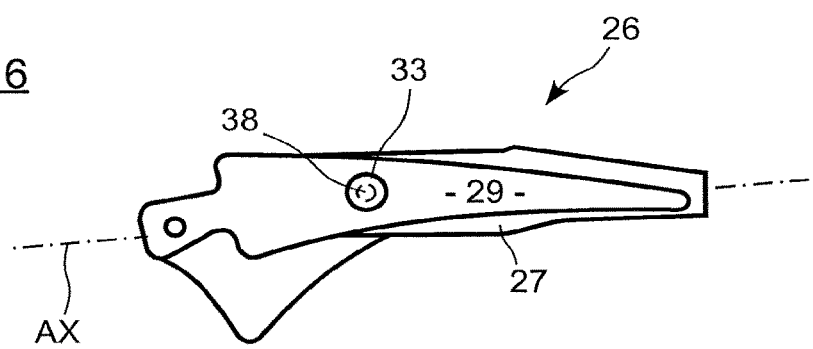
FIG. 7 is a top view of a part of a core according to the invention intended for the moulding of a blade comprising a cooling channel of its trailing edge and a beneath bath cavity situated between the end of this channel and the top of the blade with a de-dusting hole of the channel that traverses the beneath bath cavity.

The moulding core 26 of FIGS. 6 and 7 has a general layout entirely analogous to that of the core 16 of FIGS. 3 to 5. It thus comprises a downstream core element 27 intended to form a cooling channel of the trailing edge, and an upstream core element 28, it also delimiting the beneath bath cavity.

This upstream element 28 also comprises an upper portion 29 delimiting the actual beneath bath cavity, the location of the bath being marked by 31 in FIG. 6, and an upstream portion 32 to form a channel for supplying air to the beneath bath cavity. The portion 32 of the upstream core element 28 as well as the downstream core element 27 each have an elongated shape oriented along the spanwise direction.

The portion 29 of the upstream core element is traversed by a hole 33 of which the orientation is close to that of the spanwise direction EV to place in communication the upper and lower faces of this portion 29. The upper face and the lower face, respectively 34 and 36, are the faces of this portion 29 which are opposite along the spanwise direction EV. One of these faces, namely the face 34, corresponds, once the blade has been moulded, to the lower face of the bottom of the bath B situated at the location 31, whereas the other face, namely the face 36, corresponds to that which is opposite the face 37 delimiting the free end of the downstream core element 27.

As may be seen in particular in FIG. 6, the portion 29 of the upstream core element 28 and the free end of the core element 27 are spaced apart along the spanwise axis, such that a free space exists separating the faces 36 and 37.

The hole 33 makes it possible to constitute a block inside the beneath bath cavity, this hole 33 being filled by the material during the moulding operation. Once the blade has been moulded, a boring is made in the bottom of the bath, to traverse the block over its whole height as well as the space separating the beneath bath cavity from the free end of the cooling channel of the trailing edge.

This boring places the channel in direct communication with the bottom of the bath to constitute a de-dusting conduit of the cooling channel of the trailing edge of the blade, despite the presence of a beneath bath cavity.

Figure 8:
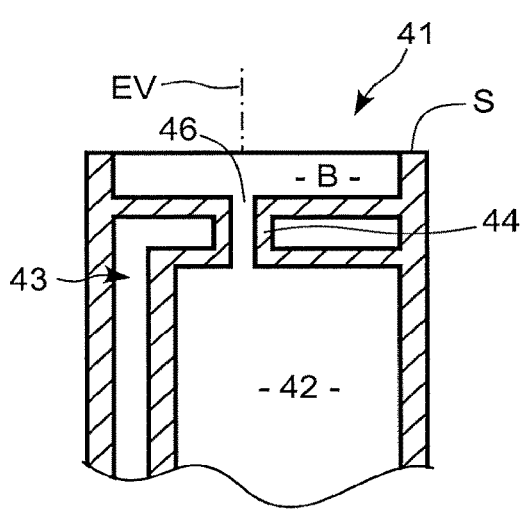
FIG. 8 is a schematic sectional representation of a portion of blade according to the invention comprising a cooling channel of its trailing edge and a beneath bath cavity situated between the end of this channel and the top of the blade.

Generally speaking, the first core element 27 delimits the first internal cavity 42 of the moulded blade 41, represented in FIG. 8, and the second core element 28 has a portion 29 which delimits the other cavity 43, these core elements 27 and 28 being rigidly connected together.

The second cavity 43 is situated between the first cavity 42 and the top of the blade along the spanwise direction EV. The portion 29 of the second core element 28 includes a through hole 33 having a general orientation corresponding to that of the spanwise direction EV. This hole 33 emerges in line with an end face 37 of the first core element 27 to form in the moulded blade a block or bridge fitting 44 traversing the second cavity 43.

This block or bridge fitting 44 enables, once the blade has been moulded, the constitution of the de-dusting conduit 46 of the first cavity 42, this conduit 46 traversing the second cavity 43 from end to end while emerging in the top of the blade and being able to be obtained by boring.

Alternatively, an alumina rod 38 may be provided with the core 26 while being implanted in the upper face 37 of the downstream core element 27, to traverse the hole 33, this rod having a diameter less than that of the hole 33, as may be seen in FIGS. 6 and 7.

In these conditions, the de-dusting channel or hole is formed directly during the moulding operation, such that a boring operation is not necessary to form the actual channel.

Generally speaking, the de-dusting hole has an orientation corresponding substantially to that of the spanwise direction EV to enable the evacuation of dusts by blowing and centrifugal effect. The direction of this hole is able to be substantially inclined with respect to the spanwise direction in order to be able also to respond to different geometric imperatives specific to the shape of the blade.

The invention thus makes it possible to minimise the mass of the blade at the end of the vane, which directly limits the centrifugal traction that the blade undergoes in service. The implementation of an alumina rod to delimit the actual de-dusting conduit further makes it possible to improve the support of the portion of core delimiting the bath situated at the top of the blade.

The geometry created by the de-dusting conduit traversing the beneath bath cavity from end to end enables a symmetrical optimisation of the flow of cooling air which is introduced in the region upstream of this beneath bath cavity to be evacuated at the downstream end of this cavity.

The de-dusting conduit that traverses the beneath bath cavity constitutes a central obstacle in this cavity. This divides the flow of air circulating in this cavity into two halves running respectively along the two lateral faces of this cavity which increases the efficiency of the cooling of these lateral faces.

The invention claimed is:

1. A core for the moulding of a turbine engine blade, said turbine engine blade including a vane extending along a spanwise direction of the blade and ending in a top, said core including: a first core element to delimit a first internal cavity of the blade and a second core element of which at least one portion delimits a second internal cavity of the blade, these core elements being rigidly connected together, the second cavity being situated between the first cavity and the top of the blade along the spanwise direction,
    wherein the portion of the second core element which delimits the second cavity includes a through hole having a general orientation corresponding to that of the spanwise direction, wherein said through hole emerges in line with an end face of the first core element to form in the moulded blade a bridge fitting traversing the second cavity, and
    a rod having a diameter smaller than that of the through hole by an amount sufficient that an annular space, into which annular space can flow material of the turbine engine blade during a process of moulding of the turbine engine blade, may be formed between an outer periphery of the rod and the portion of the second core element defining the through hole, the rod traversing the through hole and implanted in the end face of the first core element for providing a de-dusting conduit of the first cavity, said de-dusting conduit traversing the second cavity from end to end while emerging in the top of the blade and being isolated from the second cavity by the material of the turbine engine blade which has flowed into said annular space during the process of moulding of the turbine engine blade.

2. The core according to claim 1, in which the through hole is situated in a central region of the portion of the second core element which delimits the second cavity, to be spaced apart from each lateral face of said second core element, such that the bridge fitting comprises an obstacle dividing air circulating in the second cavity of the finished blade into two lateral flows.

3. The core according to claim 1, in which the first core element is arranged to delimit a cooling channel of a trailing edge of the blade, and in which the second core element is arranged to delimit a beneath bath cavity of the blade.

4. The core according to claim 1, wherein the rod is an alumina rod.

* * * * *